Nov. 18, 1924.  1,516,162
J. J. THACHER
CHUCK OPERATING MEANS
Filed April 18, 1922
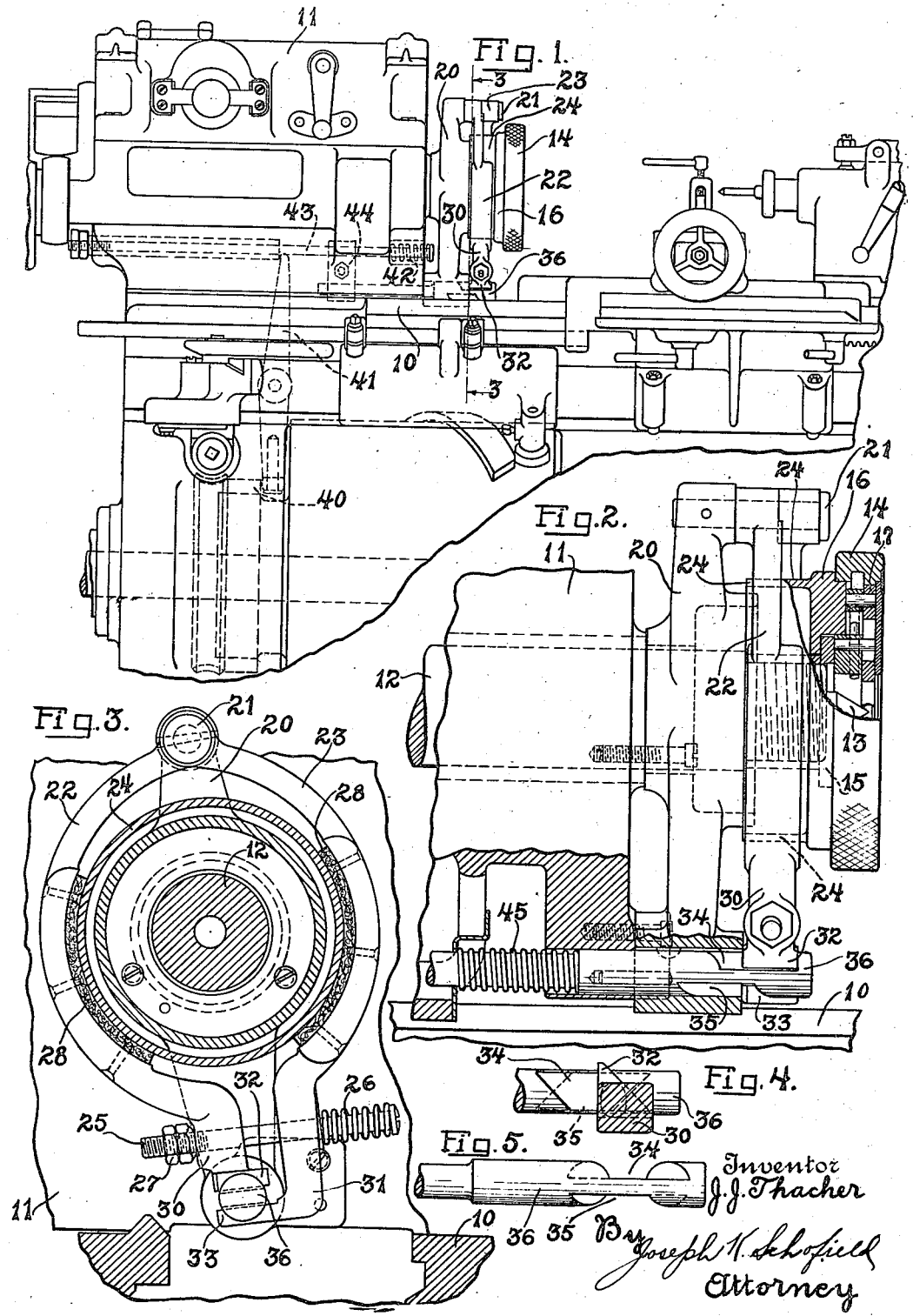
Inventor
J. J. Thacher
By Joseph N. Schofield
Attorney Patented Nov. 18, 1924.

1,516,162

UNITED STATES PATENT OFFICE.

JOHN J. THACHER, OF WETHERSFIELD, CONNECTICUT, ASSIGNOR TO PRATT & WHITNEY COMPANY, OF NEW YORK, N. Y., A CORPORATION OF NEW JERSEY.

CHUCK-OPERATING MEANS.

Application filed April 18, 1922. Serial No. 554,720.

*To all whom it may concern:*

Be it known that I, JOHN J. THACHER, a citizen of the United States, residing at Wethersfield, in the county of Hartford and State of Connecticut, have invented certain new and useful Improvements in Chuck-Operating Means, of which the following is a specification.

This invention relates to a work holding and rotating chuck and in particular to a chuck adapted for use in connection with an automatic lathe.

An object of the present invention is to provide an improved form of chuck operating means to facilitate opening and closing of the jaws of the chuck during continuous automatic operation of the lathe.

One feature which enables me to accomplish the above object is that I provide an operating rod, movement of which operates brake bands or shoes surrounding a cylindrical part of the chuck so that the chuck may be frictionally engaged by these bands without causing a sudden shock or impact on the parts of the chuck.

Another feature which is advantageous is that I operate these bands by a single rectilinear movement of the operating rod. Movement in one direction serves to positively disengage the bands from the rotating chuck and movement of the rod in the opposite direction, which may be accomplished by means of a spring, permits the brake bands to frictionally engage a rotating part of the chuck.

Another object of the present invention is to improve the means for opening the jaws of the work rotating chuck disclosed in my Patent 1,446,075 granted February 20, 1923.

With these and other objects in view, my invention consists in the features of construction and operation set forth in the following specification and illustrated in the accompanying drawing.

In the accompanying drawing annexed hereto and forming a part of this specification, I have shown my invention embodied in an automatic lathe but it will be understood that the invention can be otherwise embodied and that the drawing is not to be construed as defining or limiting the scope of the invention, the claims appended to this specification being relied upon for that purpose.

In the drawing:

Figure 1 is a fragmentary view of an automatic lathe showing the chuck in operative position thereon.

Fig. 2 is an enlarged view of the work supporting and rotating chuck and its operating means, parts being shown in section to more clearly disclose the construction.

Fig. 3 is a sectional view taken on line 3—3 of Fig. 1.

Fig. 4 is a detail plan view of the forward end of the operating rod for the chuck and a part cooperating therewith.

Fig. 5 is another view of the forward end of the chuck operating rod.

In the above mentioned drawing, I have shown but one modification of the invention which is now deemed preferable but it is to be understood that changes and modifications may be made within the scope of the appended claims without departing from the spirit of the invention.

Briefly, my invention in its broadest aspect comprises: first, a chuck preferably of the type shown in my above referred to patent; second, a frictionally engaged brake shoe or band surrounding a cylindrical portion of the chuck and adapted to be resiliently moved into engagement with its surface and positively moved away therefrom; and third, an operating rod for moving said brake bands into and out of contact with the chuck.

Referring more in detail to the figures of the drawing at 10 I show an automatic lathe of the general type disclosed in the patent granted to Müller January 8th, 1918, No. 1,252,928. Parts only of the automatic lathe are indicated in the present drawing. Mounted in the headstock 11 of this lathe is a work supporting and rotating spindle 12 having at its forward end a work supporting center 13. Surrounding the center is a work rotating chuck 14 so that work mounted in the lathe 10 may be rotated. As the type of chuck is similar to that shown in my above mentioned patent, a specific description of the operative parts thereof will be unnecessary. Briefly, these comprise a driving member 15 preferably threaded to the forward end of the work supporting and rotating spindle 12. This driving member 15 is surrounded by another part 16 driven by the driving member 15 but so mounted that it may rotate slightly relative thereto. On this second or driven member 16 are flexibly mounted chuck jaws 17 which are adapted to engage and rotate work on said spindle 12. Normally, these jaws 17 are held in driving contact with the work by spring means as clearly indicated in the above mentioned copending applications. When it is desired to remove work from the lathe, which is preferably accomplished automatically, it is only necessary to momentarily restrain the driven member 16 from rotating with the driving member 15 which thus varies the relative positions of these two members 15 and 16 and forces the jaws out of engagement with the work. This feature of the chuck is clearly disclosed in the above-mentioned patent.

It is the novel means for obtaining this relative movement between the driving and driven members 15 and 16, which is preferably accomplished by frictional means, that forms the primary improvement covered by the present application. This relative movement of the driving and driven members 15 and 16 in the present construction is accomplished gradually and without shock as the work spindle 12 and driving member 15 continue to rotate. Preferably a frictional resistance is resiliently applied to an extended part of the driven member 16 which retards rotation of this driven member and thus causes it to move relatively to the driving member 15. Previously, and as shown in my above-mentioned patent, this was accomplished by moving a rotatable sleeve into engagement with the driving member 15 in such a way that teeth on this frictional sleeve engaged teeth on the driven member 16 of the chuck 14. This, however, had the disadvantage that it subjected all parts of the chuck 14 to a sudden blow or impact as the teeth became suddenly engaged which was detrimental to the proper functioning of the chuck. I have, therefore, provided this improved means of restraining the driven member 16 from rotating with the driving member 15 momentarily until the jaws are withdrawn from the work by means which may be gradually applied to frictionally engage the driven member 16 of the rotating chuck. As soon as the jaws 17 are moved to their outermost positions, the driven member 16 again rotates with driving member 15.

It will be seen in Figs. 1 and 2 that surrounding the forward end of the work spindle 12 so that the spindle may rotate, a member 20 is provided fastened to the forward end of the headstock 11 and which at its upper end is provided with a fixed stud 21. On this stud or pin 21 are pivotally mounted oppositely disposed semi-circular brake bands or shoes 22 and 23 which surround a flange 24 forming an extension of the driven member 16 of the chuck 14. These bands or shoes 22 and 23, at their lower ends, are normally forced resiliently together by means of a bolt 25 provided with a coil spring 26 and adjusting nuts 27 so that the force urging these members 22 and 23 together may be regulated. Preferably, some friction material, such as fiber or leather strips 28 are interposed between the inner surface of the bands 22 and 23 and the flange member 24 of the chuck.

It will be seen, therefore, that these above-mentioned means permit resilient engagement of the brake bands 22 and 23 with the flange 24. This position of the brake bands is only used when it is desired to open the jaws 17 of the chuck 14 to release completed work and engage a new blank. At all other times and during the normal operation of the lathe, the brake bands 22 and 23 are held away from the flange 24.

In order to positively hold the brake bands 22 and 23 away from the flange 24 on the chuck, I provide extensions 30 and 31 respectively to the bands 22 and 23, their ends being provided with formed members 32 and 33 adapted to engage recesses 34 and 35 respectively formed in the forward end of an operating rod 36 for the chuck 14. Also on the forward end of the operating bar 36, I provide two oblique slots to form the recesses 34 and 35, one slot on the upper face and the other directly below the first on the lower face. The end walls of these two recesses 34 and 35 slope in opposite directions as indicated in Figs. 4 and 5.

It will be seen from this construction that with the operating bar 36 in one position, the projections 32 and 33 on the ends of the brake bands 22 and 23 will engage the abutments formed at the ends of the recesses 34 and 35 on the bar 36 and positively hold the brake bands out of engagement with the chuck, but, during the time when the operating bar 36 is being momentarily held in its opposite position, the brake bands 22 and 23 will be permitted to frictionally engage the flange 24 of the chuck.

It will be seen also from the above construction that by movement of the bar 36 in a rectilinear direction, which may be accomplished by a cam and lever as indicated in Fig. 1, and as fully disclosed in the patent to Müller above mentioned, the brake bands may be moved so as to either be disengaged from or moved into engagement with the periphery of the flange portion of the chuck. Preferably, movement of the bar or rod 36 in one direction is accomplished directly by the cam 40 and lever 41 and the movement in the opposite direction is accomplished through the medium of a spring 42, which operates rod 43 to which the chuck operating rod 36 is fastened by a clamp 44. In Fig. 2 the spring 45 is shown applied directly to the rod 36.

Normally and while work is being operated on, the brake bands 22 and 23 are positively held out of engagement with the chuck 14, but, when it is desired to open the chuck 14, the operating bar 36 is forced by the cam means to the right, which permits the brake bands to move gradually into frictional engagement with the flange 24 on the chuck and thus slightly retard rotation of this member relative to its driving member 15 on the work spindle 12. This, as above described, serves to positively withdraw the chuck jaws 17 from engagement with the work and hold them out of engagement until the rod 36 is moved again to its initial position.

What I claim is:

1. A work carrier for lathes comprising in combination, a work supporting and rotating spindle, a driving member mounted on and rotating with said spindle, a driven member associated with said driving member, jaws supported by said driven member, and means comprising a brake shoe frictionally engaging said driven member to automatically open said jaws while said driving member continues to rotate.

2. A work carrier for lathes comprising in combination, a work supporting and rotating spindle, a driving member mounted on and rotating with said spindle, a driven member associated with said driving member, work engaging jaws supported by said driven member, and means comprising a brake shoe movable to frictionally engage said driven member to automatically open said jaws while said driving member continues to rotate.

3. A work carrier for lathes comprising in combination, a work supporting and rotating spindle, a driving member mounted on and rotating with said spindle, a driven member associated with said driving member, jaws supported by said driven member, and means comprising a brake shoe surrounding and frictionally engaging said driven member to relatively move the driving and driven members to automatically open said jaws while said driving member continues to rotate.

4. A work carrier for lathes comprising in combination, a work supporting and rotating spindle, a driving member mounted on and rotating with said spindle, a driven member associated with said driving member, jaws supported by said driven member, and means comprising a brake shoe frictionally engaging said driven member to momentarily retard rotation of said driven member to move said driven and driving members and to automatically open said jaws while said driving member continues to rotate.

5. A work carrier for lathes comprising in combination, a work supporting and rotating spindle, a driving member mounted on and rotating with said spindle, a driven member associated with said driving member, jaws supported by said driven member, means comprising a brake band surrounding and frictionally engaging said driven member to automatically open said jaws while said driving member continues to rotate, and means to release said brake band from the driven member.

6. A work carrier for lathes comprising in combination, a work supporting and rotating spindle, a driving member mounted on and rotating with said spindle, a driven member associated with said driving member, jaws supported by said driven member, means normally holding said jaws in work engaging position, and means comprising a brake shoe surrounding said driven member and adapted to be moved to frictionally engage said driven member to automatically withdraw said jaws from work engaging position while said driving member continues to rotate.

7. A work carrier for lathes comprising in combination, a work supporting and rotating spindle, a driving member mounted on and rotating with said spindle, a driven member associated with said driving member, jaws supported by said driven member, means normally holding said jaws in work engaging position, and means comprising a brake shoe surrounding said driven member and adapted to be moved to frictionally engage said driven member to momentarily and automatically withdraw said jaws from work engaging position while said driving member continues to rotate.

8. A work carrier for lathes comprising in combination, a work supporting and rotating spindle, a driving member mounted on and rotating with said spindle, a driven member associated with said driving member, jaws supported by said driven member, means normally holding said jaws in work engaging position, means comprising a brake shoe surrounding said driven member and adapted to be moved to frictionally engage said driven member to automatically withdraw said jaws from work engaging position while said driving member continues to rotate, and means to return said jaws to work engaging position when said brake shoe is released.

9. A work carrier for lathes comprising in combination, a driving member, a driven member associated with said driving member and relatively movable therewith, jaws supported by said driving member and moved into and out of work engaging position by relative movement between said driven and driving members, means comprising a two-part brake band surrounding and adapted to engage the driven member to rotate said driven member relative to the driving member whereby said jaws are automatically withdrawn from operative position, means normally holding said parts of the brake band resiliently together, and means to positively separate said parts.

10. A work carrier for lathes comprising in combination, a driving member, a driven member associated with said driving member and relatively movable therewith, jaws supported by said driving member and moved into and out of work engaging position by relative movement between said driven and driving members, means comprising a two-part brake band surrounding and adapted to engage the driven member to rotate said driven member relative to the driving member whereby said jaws are automatically withdrawn from operative position, automatic means normally holding said parts of the brake band resiliently together, and automatic means to positively separate said parts.

11. A work carrier for automatic lathes comprising in combination, a driving member, a driven member associated with said driving member and relatively movable therewith, jaws supported by said driven member and movable into and out of work engaging position by relative movement between said driven and driving members, means comprising a brake band surrounding and engaging the driven member to relatively move said driving and driven members, and means normally holding said band out of contact with said driven member, movement of said means in one direction permitting frictional engagement of said band with said driven member to relatively rotate said driving and driven members to move said jaws out of work engaging position.

12. A work carrier for automatic lathes comprising in combination, a driving member, a driven member associated with said driving member and relatively movable therewith, jaws supported by said driven member and movable into and out of work engaging position by relative movement between said driven and driving members, means comprising a brake band surrounding and engaging the driven member to relatively move said driving and driven members, and automatically operating means normally holding said band out of contact with said driven member, movement of said means in one direction permitting frictional engagement of said band with said driven member to relatively rotate said driving and driven members to move said jaws out of work engaging position.

13. A work carrier for automatic lathes comprising in combination, a driving member, a driven member associated with said driving member and relatively movable therewith, jaws supported by said driven member and movable into and out of work engaging position by relative movement between said driven and driving members, means comprising a two-part brake band surrounding and adapted to engage the driven member to relatively move said driving and driven members, and means normally separating said parts to hold said band out of contact with said driven member, movement of said means permitting said parts to close together to frictionally engage said band with said driven member.

In testimony whereof I hereto affix my signature.

JOHN J. THACHER.